United States Patent [19]

Stoner et al.

[11] Patent Number: 5,150,991
[45] Date of Patent: Sep. 29, 1992

[54] PARTICULATE-MATERIAL GUN WITH IMPROVED SEALING SYSTEM

[75] Inventors: David J. Stoner, Corona del Mar; Joseph M. Sanger, San Gabriel; Louis E. Pahoundis, La Crescenta; James H. Riahi, San Dimas, all of Calif.

[73] Assignee: Reed Manufacturing, Walnut, Calif.

[21] Appl. No.: 645,589

[22] Filed: Jan. 24, 1991

[51] Int. Cl.[5] ............................................. B65G 53/00
[52] U.S. Cl. ....................................................... 406/67
[58] Field of Search ................... 406/66, 67; 269/236, 269/231, 229

[56] References Cited

U.S. PATENT DOCUMENTS

| | | | |
|---|---|---|---|
| 1,488,866 | 4/1924 | Clark | 269/236 X |
| 1,619,340 | 3/1927 | Fullerton | 269/229 X |
| 2,113,852 | 4/1938 | Meade | 269/236 X |
| 2,506,436 | 5/1950 | Seybold | 269/229 X |
| 2,620,693 | 12/1952 | Eslick | 269/229 X |
| 2,788,687 | 4/1957 | Ridge | 269/229 X |
| 2,992,672 | 7/1961 | Lindner | 269/236 X |
| 3,161,442 | 12/1964 | Reed | |
| 4,462,719 | 7/1984 | Egger et al. | 406/64 |

FOREIGN PATENT DOCUMENTS

| | | | |
|---|---|---|---|
| 199853 | 9/1958 | Austria | 406/67 |
| 945070 | 4/1949 | France | 269/236 |

Primary Examiner—Margaret A. Focarino
Assistant Examiner—Gary C. Hoge
Attorney, Agent, or Firm—Ashen & Lippman

[57] ABSTRACT

One aspect of this gunite or refractories gun is a seal-clamping system that applies an essentially constant force despite variables such as wear of the seal or seals. Another aspect is a combination of hydraulic control and mechanical cams to clamp the seal(s). Ideally both aspects are used. Preferably the system also balances seal-clamping forces at different points. Chambers in a rotary feed structure carry material from a hopper at a receiving port to a delivery tube at a discharge port. Gas (usually air) flows from a pneumatic supply orifice to blow material from the feed structure into the distance port. One or more seals are used to seal the path that is formed by the pneumatic supply orifice, at least one chamber (when generally in position for discharge), the discharge port, and the delivery tube. A set of cams or other mechanical apparatus applies force to press the seal(s) against the feed structure. Biasing apparatus - preferably a hydraulic system, pressurized through a hydraulic check valve by a regulated air supply - applies a regulated force to drive the cams or the like, and stabilize the force with which they press the seal(s) against the feed structure. Release of clamping is facilitated by using a check valve of a pilot type, and using part of the same control system to power the cams, etc. out of clamped condition. A manually operated pneumatic valve selects between clamped and unclamped modes.

50 Claims, 3 Drawing Sheets

PARTICULATE-MATERIAL GUN WITH IMPROVED SEALING SYSTEM

BACKGROUND

1. FIELD OF THE INVENTION

This invention relates generally to apparatus for conveying particulate material such as gunite, refractories, or the like to and through a delivery tube; and more particularly to such an apparatus that has an improved sealing system.

2. PRIOR ART

For purposes of this document, particulate material includes material in the range of sizes extending from dusts through gravel; and the term "conveying" encompasses projecting as from a gun.

Most commercially available apparatus for conveying particulates generally follows one of two basic configurations. U.S. Pat. No. 3,161,442, issued to Frank A. Reed in 1964, introduced one of those configurations and is hereby incorporated by reference in its entirety.

For convenience the drawings of Reed's patent are adapted here as FIGS. 4 through 10, described later in this document.

Figures 4, 5, 6, 7, 8:
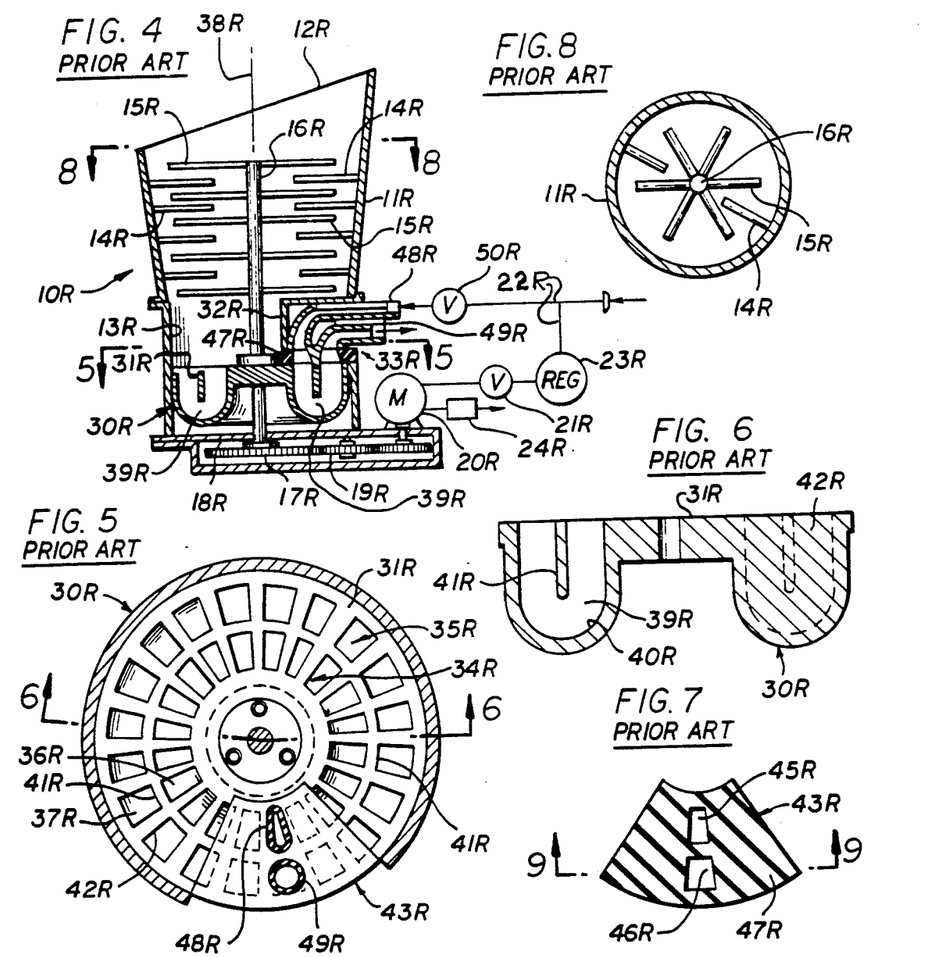
FIG. 4 is a side elevation, partly in cross-section and partly in schematic notation, showing a preferred embodiment disclosed in that '442 patent (in this drawing the section lines identified as "5—5" and "8—8" were originally identified in the Reed '442 patent as "2—2" and "5—5" respectively)
FIG. 5 is a cross-section taken at line 5—5 of FIG. 4 (in this drawing the section line identified as "6—6" was originally identified in the Reed '442 patent as "3—3")
FIG. 6 is a cross-section on line 6—6 of FIG. 5.
FIG. 7 is a plan view of a portion of FIG. 4 (in this drawing the section line identified as "9—9" was originally identified in the Reed '442 patent as "6—6")
FIG. 8 is a cross-section taken at line 8—8 of FIG. 4.
Figures 9, 10:
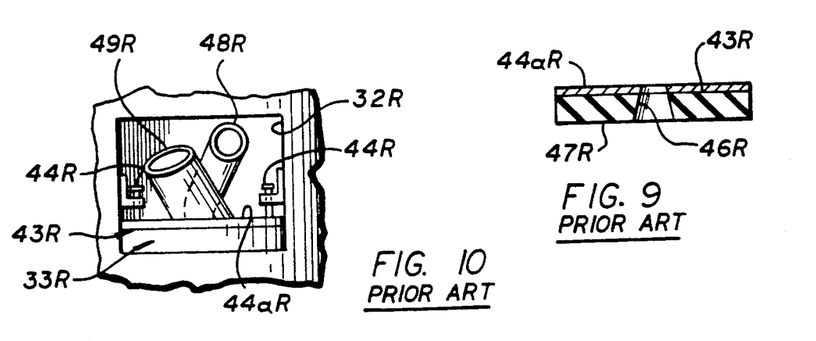
FIG. 9 is a cross-section taken at line 9—9 of FIG. 7.
FIG. 10 is a side elevation of a portion of FIG. 4.

Reed shows apparatus 10R that includes a hopper 11R with top and bottom circular openings 12R, 13R containing stationary and rotary agitator blades 14R, 15R—the latter mounted on a rotary shaft 16R. The shaft, held in a bearing 17R in a base 18R, is driven through a gear train 19R by a fluid motor 20R.

A valve 21R receives fluid from a supply 22R via a regulator 23R, to control the motor. Exhaust air is muffled at 24R. Keyed to the shaft is a feed rotor 30R, whose face 31R receives material at the lower opening 13R.

A housing 32R shrouds some 45° of the lower opening, above an expulsion station 33R, leaving the face 31R open to the hopper over about 315°. Formed in the rotor 30R about its central axis 38R are two concentric sets of ports 34R, 35R, each radially associated pair of ports forming an upright U-shaped pocket 39R with a round bottom 40R, baffle 41R and radial walls 42R.

An orifice plate 43R is fixed in the housing 32R by screws 44R through a hose baseplate 44aR. The plate 43R has inlet and outlet conduits 45R, 46R—and holds inlet and outlet hoses 48R, 49R—for alignment with the ports 34R, 35R respectively.

A rubber pad 47R (FIGS. 7 and 9) on the orifice plate 43R is pressed against the rotor face 31R screws 44R, and rubs against the face when the rotor 30R turns. Unregulated fluid from the supply 22R is applied to the inlet hose and port 48R, 46R to blow granular material through the pockets 39R—as they rotate into registration with the ports 45R, 46R—and out through the outlet port and hose 46R, 49R to a place of use.

Another basic configuration, generally used by European manufacturers, may be exemplified by U.S. Pat. No. 4,462,719 for a "Concrete Gun", which issued Jul. 31, 1984, to Hans R. Egger and Rudolf Vogler, based upon a 1981 Swiss application.

Such machines are usually mounted on a wheeled cart; and all include means defining a receiving port for receiving such material from a hopper. In both of the basic configurations the receiving port is essentially the bottom of the hopper, but in the European configuration it also includes an annular arcuate opening in a disc-shaped structure just below the hopper—as will be described shortly.

Such apparatus also includes means defining a discharge port for discharge of such material into a delivery tube. In Reed's system the discharge port is immediately adjacent to the receiving port, whereas in the European system they are separated by another element which we shall take up next.

At the heart of both systems is a feed structure mounted for rotation and defining many parallel chambers (in principle at least one such chamber is required) for receiving material from the receiving port, and for carrying received material by that rotation to the discharge port for discharge. This structure is generally of steel, and in the Reed configuration is usually called a "feed rotor".

Both the Reed configuration and the European configuration also include pneumatic means, defining and including a pneumatic supply orifice, for applying gas to blow material from the feed structure into the discharge port. The same pneumatic blast also propels the material through the discharge port into the delivery tube, and typically projects the material from the remote end of that tube to a delivery point at a construction site or the like.

Reed's preferred design calls for each chamber to take the shape of a "U"-shaped tube, often called a "pocket"—with a central partition extending partway to the bottom. In this arrangement accordingly the receiving and discharge ports are both at the same side of the feed structure.

This is the reason for the immediate adjacency, mentioned earlier, of those two ports. The "U" shapes of all the individual pockets, when formed in a circular array about the axis of the feed rotor, gives the feed rotor a distinctive bowl-shaped appearance; the feed rotor is therefore sometimes called a "feed bowl" or familiarly just a "bowl".

The axis of rotation is vertical, and the "U" shapes are all erect and right-side-up, so that each pocket in the bowl is open at the top as is an ordinary bowl. Typically the bowl has a floor that is generally continuous and solid, though rounded. The floor forms the adjacent bottoms of all the pockets in common, and typically is perforated only by an axle-mounting hole at its center.

In the machines of European configuration, by contrast, the chambers are all *straight* and pass completely through the feed structure, so that it somewhat more closely resembles a rotary bullet-shell magazine in a hand revolver—but, here too, with the axis of rotation vertical. The receiving and discharge ports in such a configuration thus are at the two opposite ends (namely, the top and bottom respectively) of the feed structure.

The pneumatic supply orifice is also at the top of the structure. It is aligned above the discharge port at a generally common angular position about the axis, so that air from that orifice can blow material into the discharge port.

Both configurations include sealing means for substantially sealing a pneumatic path defined by the pneumatic supply orifice, the discharge port, the delivery tube, and at least one chamber when generally in position for discharge. It can now be appreciated, however, that in the Reed system a single unitary seal (usually called a "pad") suffices for the complete sealing function—since the pneumatic path passes in and out of the feed bowl at exclusively one side (namely, the top) of the bowl.

In the straight-through configuration, however, two separate seals are required. One seal (sometimes called a "joint plate" or "sealing plate") is at the top, to seal the inlet half of the pneumatic path: the junction between the pneumatic supply orifice and the chamber. The other seal (sometimes known as the "gasket plate" or "sealing plate") is at the bottom, to seal the outlet half of the path: the junction between the chamber and the discharge port and delivery tube.

Our phrase "sealing means" encompasses both a single unitary seal as in the Reed system, and two discrete seals as in the European systems. It also encompasses other seal configurations, whether unitary or plural. In all gunite and refractory guns, as far as we are aware, the sealing means are of hard rubber or the like; however, other elastomers or elastomer-like materials possibly could be used.

There is another difference between the sealing means used in the two configurations. In the European machines, both the top and bottom seals cover almost the entire circular surfaces at top and bottom respectively.

At the bottom, almost the only significant aperture in the seal is at the discharge port—and that is only of a relatively small areal extent, generally equal to the area of one or two chambers. This small aperture thus exposes the bottom of the particular chamber or chambers that are rotated into position for discharge.

The bottom seal, generally circular, must cover all the rest of the chambers at their bottom ends. In these machines the bottom seal not only stands off the air pressure, but also supports the material against gravity. The generally circular seal forms the floor of every chamber and is thus the only thing holding the material in the chambers as they rotate.

Similarly the seal at the top of the feed rotor has a small aperture at the pneumatic supply orifice—aligned directly above the discharge port. In addition, however, the top seal has a much larger aperture, for admission of material from the hopper.

This aperture, which may be regarded as part of the receiving port, usually is annular and spans an arc of perhaps eighty to one hundred degrees. The seal is generally a circular disc, and its center and periphery—that is, the portions radially inward and outward from the annular aperture—are substantially continuous all the way around the circle.

In Reed's configuration, by contrast, the seal covers only a relatively narrow sector of the circular top surface of the feed structure. In principle it could be extended around the rest of the circular surface, except for the annular region through which particulate material falls into the open tops of the chambers, as in the European machines. For historical reasons, however, the seals have never been so formed in machines of the Reed configuration. Conversely in principle the top seals of the European systems could be restricted to only a narrow sector.

Both configurations also include mechanical means for applying force to press the sealing means against the feed structure. As will be seen, these means are of particular importance to the present invention; we shall shortly discuss them in detail.

Such a pressed-together seal must be maintained while the feed structure rotates. Of course this entails a sliding and rubbing contact between the sealing means and the feed structure.

As will be understood the resulting abrasion by the material being conveyed can very severely erode the rubber sealing means or the steel feed structure, or most typically both. Such erosion in fact has been found particularly troublesome in both of the configurations discussed above, leading equipment manufacturers to try a variety of divergent approaches to controlling it.

In the commercial implementation of the Reed configuration, bowl damage from this erosion has led to fabrication of some bowls in two sections. A bottom section defines the "U" shapes of the bottoms of all the pockets; and an upper section, usually only about an inch tall, has the same pattern of walls and apertures as the bottom section and is carefully aligned over the bottom section.

This thin upper section is separately fabricated merely to facilitate its replacement without the need for replacing the entire bowl. This extension of the bowl accordingly is termed a "wear ring" or "wear plate", while the nomenclature "the bowl" is sometimes reassigned to refer to the bottom section, even though in a sense that element is only part of the two-piece bowl.

Some machines of the European configuration are similarly split—but into three sections rather than only two, because of the separate seals. Thus wear rings or plates (sometimes in these machines also called "rotor plates") appear at both top and bottom. The term "feed rotor" is then reassigned to the remaining center section.

In any event our phrase "feed structure" used in this document for machines of the bowl configuration encompasses *both* parts, however they may be designated—that is, both the "wear ring" and "the bowl", or "both sections of the bowl", etc. For machines of the European straight-through configuration, our phrase "feed structure" analogously encompasses *all three* parts, however designated—the two "wear plates" and "the rotor", or "all three sections of the rotor", and so forth.

Each rubber seal is usually vulcanized to a respective steel or cast-iron mounting plate, which is later discarded with the seal (or recycled to a new seal) when the seal is worn out. Pressing against each of these mounting plates is a heavier metal part that is a permanent piece of the machine and that is sometimes called a "pad backup plate" or the "pad housing" in the Reed configuration, and a "clamp plate" in the European units.

For purposes of this document both the vulcanized-on plates and the pad backup, housing or clamp plates may be regarded as part of the mechanical means for applying force to press the sealing means against the feed structure. The pad backup, housing or clamp plates, however, also serve as mountings for a tube from the pneumatic supply system, and for a delivery-tube attachment fitting (in the Reed units, a short strong metal pipe called the "gooseneck").

Therefore the various plates just discussed may also (or instead, if preferred) be considered parts of the pneumatic means, the discharge port, and the delivery tube. As the four elements—the mechanical means, pneumatic means, discharge port and delivery tube—effectively come together at these points, the backup, housing or clamp plates usually serve as parts of all four.

The mechanical force-applying means, in addition to these plates, have taken a great variety of forms. One such form, for a Reed-style machine, consists of an elaboration of the adjusting screws 44 shown in FIG. 7 of the Reed patent.

In that elaborated clamping mechanism, three spaced-apart parallel adjusting studs are controlled by a system of three knobs, two sprockets, and three chains—the sprockets and chains operating in grease within a sealed housing. The studs are threaded vertically through the pad housing or backup plate, and bear directly (just below that housing or plate) against the mounting plate to which the pad is vulcanized.

Each handle, through its associated sprockets and chain, operates the top end of one of the studs, respectively. In this way force is manually applied at the corresponding three spaced-apart points to press the pad against the bowl or wear plate. Because force is applied rather directly, a careful operator may be able to obtain a good "feel" for the amount of force being applied.

Another form, also in a machine of the configuration patented by Frank Reed, consists of two cams, spaced apart near opposite edges of the pad, and operating about parallel horizontal axes to bear against the pad-backup plate or housing. Each of the two cams is secured to a respective horizontal pin, several inches long, for rotation with the pin.

Each cam also is split into two cam sections—one near each end of the pin. The pin is actuated near its center by a lever, which in turn is manually operated (as for example through a system of leadscrews and handles). This two-stage system, as will be appreciated, may possibly provide greater mechanical advantage and thus in theory a greater degree of control over the force applied to the pad—though perhaps somewhat less sensitivity to the level of force that is being applied.

Another way of pressing the seal or seals against the feed structure has been used in some European machines. That approach uses a hydraulic system, with a plurality of actuators.

The stems of these actuators, bearing against the clamp plates, constitute yet a third form of mechanical means for applying force to press the sealing means against the feed structure. In this arrangement a manually operated hydraulic jack is used to control the hydraulic system.

The jack is set at a desired position. Here too, as will be understood from the known properties of hydraulic systems, such apparatus provides quite delicate control of the force applied to the gasket plates or joint plates, etc.

Other systems that have been employed are generally variations of these three. Unfortunately, despite the variety of seemingly reasonable means employed for this purpose, it is well known in the industry—and has been well known for more than twenty years!—that seals and feed structures in all these machines are subject to severe and irregular wear.

Such wear is a significant problem to operators and owners of these machines. First, although the seals themselves represent a relatively small fraction of the total cost of a machine, the machines have useful lives of many years; thus the cost of seal replacement usually represents a relatively large fraction of the annual amortization and operating cost. The same is even more emphatically true of feed-structure (or even wear-ring) replacement.

Perhaps more importantly, the inconvenience and great costliness of machine down time for seal replacement are very significant. This is particularly so when wear is irregular or erratic and therefore unpredictable, and excruciatingly so in relatively remote work sites where replacement seals may not be readily available.

It is not unusual for a contractor working in a small city or remote rural job site to be forced to stop work for hours or even days while a source of replacement seals is sought frantically. It is rather commonplace for replacement seals to be carried by air courier to an inoperable machine.

Guns of Reed's configuration have proven to be relatively advantageous in terms of seal replacement. The seal is relatively small and hence inexpensive, and is mounted only at one edge of the feed structure—and only on its top.

Thus the seal is very quickly and easily removed through a small access port at the side of the machine, just below the hopper. Despite these advantages, the problems of seal and wear ring erosion as already described are notorious even with Reed-type machines.

From the character of the European configuration it will be clear that far more extensive disassembly and reassembly are required for seal replacement, particularly with respect to the bottom seal or gasket plate. Many operators have a fully understandable, if unfortunate, aversion to performing such operations under field conditions. In some cases such an aversion may aggravate the eventual outcome by delaying needed work until it becomes unavoidable at times or places that are particularly inconvenient.

In the European machines, from what was said earlier about seal geometry, the seals also are far larger, elaborate in construction, and expensive than those for the Reed configuration. Hence they are not found in stock as readily in outlying areas.

Perhaps the European seal configuration may be somewhat less sensitive to incorrect or unbalanced clamping force, as clamping force and therefore wear are distributed over a greater area—namely, the entire surface—at both top and bottom, so that replacement may be required less frequently. On the other hand, wear at the bottom seal is somewhat aggravated by the fact that material is pressed against that seal by gravity—acting on the full load of material in the hopper, pressing down upon the material in each chamber.

Furthermore, the fact that seal replacement in the European machines is less frequent but difficult has its own drawbacks, particularly when the replacement schedule is unpredictable because the wear is irregular or erratic. These conditions in combination simply mean that the experience and skill (as well as the seals) needed for a quick and correct replacement operation are less likely to be available when the time comes.

In any event, seal-replacement problems in machines of the Reed configuration, as already noted, are significant and notorious. In machines of the European configuration these problems can readily become catastrophic—although possibly at a lower frequency.

Hence for both types of equipment there is and for many years has been a major unmet need for improvement in the control of seal wear. Our invention is directed to this need.

SUMMARY OF THE DISCLOSURE

Before presenting a formal description, we wish to point out that our invention flows partly from certain realizations which we have had about the causes of excessive and irregular seal wear. We know of no prior statement of these realizations, or recognition of the character of the problem; and certainly no coherent integration of them in one place, at least for the different types of seal-clamping systems in use.

We believe that such an integrated recognition forms a portion of our invention. Accordingly we have reserved discussion of these points for the present section.

The inadequacy of all the systems discussed above has several common factors. After we have set forth those factors, the merits of the invention which we shall then describe will be more readily appreciated.

First, the machine operators who must adjust the force on the seals have no way to know what the force should be. In other words, while they know what the force they are applying "feels like," they are provided no criterion on which to determine whether that is too much or too little force.

Second, in most machines of which we are aware, the operators also have no way to quantitatively determine or accurately reproduce the amount of force. (As an exception, some machines with hydraulic-jack actuation, mentioned earlier, may have a pressure gauge on the hydraulic system.) Of course an enterprising operator might place a torque wrench, instead of a handle, on the control studs—or instead of a lever, on the cam-drive pin; but these techniques are not provided or taught by the prior art that is known.

Third, even if the operators did have some good way to decide whether particular force settings were suitable, and thereby to select "good" settings, the operators still would have no objective way to determine, for the particular force settings which they had selected, how often to check and readjust the force settings. In fact, heavier clamping results in faster seal wear, so the frequency with which readjustment is required varies with the setting.

Fourth, even using the hydraulic system mentioned in the preceding section of this document, the operators may have inadequate control over the balance between force levels applied at different points. A hydraulic system may tend to equalize forces applied at different points across the circular sealing areas, but in some systems equalization may not be what is required.

To the contrary, different levels of force may be desired at, for example, the leading and trailing edges of the annular feed orifice in the upper "joint plate" seal because the chambers are empty at the leading edge and overflowing with abrasive material at the trailing edge. Heavier force at the trailing edge may therefore be preferable, to prevent the material from getting under the seal at that point; or lighter force there may be desirable to reduce wear.

On the other hand, the forces at leading and trailing edges of that same orifice may be modified by distortion of the joint plate itself—due to the directional character of its forcible rubbing on the feed rotor. Similarly in some machines different force may be required nearer the center of the feed structure, relative to the force required nearer the periphery, since the speeds of the rubbing contact are different in those two regions respectively.

To compensate for all these effects in combination, it may be desirable to load the area near one edge of the orifice more heavily than the other edge; but unless special provision is made for doing so, a multiactuator hydraulic system in its simplest form will merely equalize, rather than properly balancing, the forces at both edges.

Fifth and finally, in testing several seal-clamping systems before perfecting our invention we have also found that a hydraulic system operating directly upon the sealing means—with the hydraulic system locked in an effort to hold a particular level of force—is susceptible to rapid and extreme pressure variations or fluctuations, apparently arising at the sealing means and propagating back through the hydraulic actuators into the hydraulic fluid. Such pressure "spikes" may tend to produce erratic or irregular wear of the sealing means, or to impair the reliability of the hydraulic system.

The invention is apparatus for conveying particulate material such as gunite from a hopper to a delivery tube. The particulate material, hopper and tube are elements of the context of our invention as most broadly set forth here and in the broad claims appended, although in others of the appended claims they may appear as elements of the claimed combination.

According to the Gunite Contractors Association (Sylmar, Calif.) gunite or "Gunite" is a former registered trademark, now in generic use as a trade name. It is thus used for "a mixture of Portland cement and sand thoroughly mixed dry, passed through a cement gun and conveyed by air through a flexible tube, hydrated at a nozzle at the end of such flexible tube and deposited by air pressure in its place of final repose."

Machines of the character identified in this document, however, are often used or perhaps misused for such delivery of the same or similar materials in a slightly damp form, or sometimes even wet. Such use, particularly with the material relatively wetter, often results in problems with the machines or otherwise, and we therefore believe that it should be discouraged; however, without endorsing such use we mean to encompass it within the phrase "particulate material such as gunite" for purposes of the appended claims.

Thus we do not means for a user of our invention to escape, merely through misuse or purported misuse of the apparatus, from the restrictions imposed by the appended claims. We also define the above phrase to include particulate or loose granular refractory material—as for application within a chimney, stack, breechings, or furnace—in modern techniques that are well known.

Our invention includes some means defining a receiving port for receiving such material from such a hopper. It also includes some means defining a discharge port for discharge of such material into such a delivery tube.

In describing elements of our invention in this section of this document and in the appended claims, we refer to elements of the context using the word "such"—as in "such material", "such a delivery tube", etc. In adopting this use of the word "such" we employ a standard dictionary usage, here serving to clarify which recited features are elements of the claimed combination and which are not, and thereby to more particularly point out and distinctly claim the invention.

The invention also includes feed structure mounted for rotation and defining at least one chamber for receiving such material from the receiving port and for carrying received material by said rotation to the discharge port for discharge. Such feed structure may take either of the forms described and discussed in the preceding section, or other forms.

For example, each chamber in a partially bowl-like feed structure might be "L" shaped—opening vertically to an upper, circular surface for receiving material, and opening radially to a either a peripheral, cylindrical surface or to a central conduit, of the feed structure. In a variant closer to the European configuration, chambers might be oriented angularly rather than parallel to the axis of rotation, so that the pneumatic orifice and the discharge port would be offset radially or circumferentially, or both. Alternatively, in principle a feed structure could be mounted for rotation about a horizontal axis, as is a ferris wheel.

Our invention also includes pneumatic means, defining and including a pneumatic supply orifice, for applying gas to blow material from the feed structure into the discharge port. The most, or perhaps only, practical gas for this purpose apparently is air; others are within the scope of the claims.

The invention must further include some means for substantially sealing a pneumatic path defined by the pneumatic supply orifice, the discharge port, such tube, and at least one chamber when in position for discharge. For purposes of greatest breadth and generality in discussing our invention, we shall refer to these means simply as the "sealing means"; these means may take any of the forms described in the preceding section, or other forms suited to sealing the configurations described in that section or this section.

The invention also includes some mechanical means for applying force to press the sealing means against the feed structure. Again for generality and breadth we shall call these means the "mechanical means".

Our invention encompasses at least two aspects, directed to resolving different aspects of the foregoing limitations of prior known systems as well as observed limitations of some prototype equipment. All of the context and elements so far recited are common to both aspects.

In a first of the two aspects of our invention, the invention also includes some means for applying a substantially regulated level of force to drive the mechanical means—and to substantially stabilize the level of force applied by the mechanical means to press the sealing means against the feed structure. We shall call these the "biasing means".

In principle the biasing means may take any of a great variety of forms. We mean to make clear, however, that we exclude the prior-art sealing means themselves, though resilient, from serving as the biasing means.

Among other reasons is that they could not provide adequate travel to compensate for any significant fraction of their own wear. In purest theory, novel sealing means, but not the prior-art sealing means, might possibly be made to serve as their own biasing means.

The foregoing may be a description of the first aspect of our invention in its broadest or most general form. From what has already been said above, it will be understood that this first aspect of our invention corrects all the failings of the prior seal-clamping apparatuses—and thereby resolves all the previously detailed severe problems related to seal wear in the prior-art machinery.

That is, the manufacturer of apparatus according to our invention determines in advance the optimum force for seal clamping in each machine, or if preferred the optimum forces in each machine under various specified circumstances. The manufacturer then sets that force or provides to the operator enough information to do so; then the biasing means maintain the preset force through a built-in regulation function.

We know of no prior system in which seal-clamping force has been regulated by any means. Further, as will shortly become clear, we have developed and refined a particularly advantageous system for effecting such regulation; and we thus believe that we are the first to invent a particulate-conveying apparatus in which seal-clamping force is regulated.

Our invention as described so far thus resolves the first three of the five "factors" discussed in the preceding section. As will be appreciated, however, we prefer to practice our invention with certain other features or characteristics that optimize its performance and maximize the enjoyment of all the benefits inherent in the invention.

For example, we prefer that the biasing means include hydraulic means for applying force to drive the mechanical means and to control the level of force applied to press the sealing means against the feed structure. We also prefer that the biasing means include substantially regulated means for substantially stabilizing the amount of force applied by the hydraulic means to the mechanical means.

We have found through extensive trial-and-error that the use of a hydraulic subsystem as an intermediary between a regulated force-stabilizing subsystem and a mechanical force-application subsystem yields particularly smooth, reliable operation over long periods of time and under varied conditions. We believe that one reason for this advantageous performance is, in general terms, that the hydraulic subsystem though very simple and economical, is amenable to control by a relatively delicate, sensitive and therefore stable and accurate regulation subsystem.

We believe that another reason is that the hydraulic subsystem permits very reliable control—including force lockup if desired—of the mechanical subsystem at relatively very high force levels. Thus it is an excellent intermediary for purposes of our invention.

We believe that still another reason for the beneficial results of using a hydraulic intermediary subsystem is that it facilitates either equalization or balancing between plural mechanical force-applying elements—operating, as noted above, at very high force levels. We wish to make plain, however, that the excellent performance and the value of our invention, as embodied in a system with a hydraulic biasing means, are demonstrable for themselves; and are not dependent upon the accuracy of these theories as to the reasons for its excellent performance.

We also prefer that the hydraulic means in turn include these four components:

(1) a first hydraulic compartment for holding hydraulic fluid at a pressure controlled by the regulated means;
(2) a second hydraulic compartment for receiving hydraulic fluid at that controlled pressure from the first hydraulic compartment, and for holding hydraulic fluid in contact with at least one hydraulic actuator that applies force to the mechanical means;
(3) a hydraulic line for delivering hydraulic fluid from the first hydraulic compartment to the second hydraulic compartment; and
(4) a check valve in the hydraulic line, for deterring backflow of hydraulic fluid from the second hydraulic compartment to the first hydraulic compartment.

We consider the check valve advantageous. It isolates the first hydraulic compartment—and thereby the regulating subsystem or "substantially regulated means"—from strong fluctuations in hydraulic pressure that may arise in the second hydraulic compartment upon generation of large abrupt force fluctuations or "spikes" at the mechanical means.

We also prefer that the substantially regulated means include these four components:

(1) a supply of compressed gas;
(2) at least one pneumatic vessel for receiving compressed gas from the supply;
(3) a pneumatic pressure regulator for substantially stabilizing the pressure of the gas in the pneumatic vessel; and
(4) means for applying substantially stabilized pressure from the compressed gas in the pneumatic vessel to the hydraulic fluid in the first hydraulic compartment.

Pneumatic regulation is particularly advantageous in these devices. As indicated in the patent to Frank Reed and as well known throughout the industry, most gunite guns operate from airmotors and use air to fire the material through the discharge port and delivery tube.

Therefore in the vast majority of instances a supply of compressed air is ready at hand, and in fact already attached to the machine. These facts make our invention extremely easy and economical to implement, even in the retrofit context.

For those few cases in which compressed air is not available, a very small compressor, powered electrically or from a power takeoff—or otherwise as convenient—can be easily added at nominal cost. Pneumatic regulation also provides extremely easy, safe, delicate control.

Such regulation can be factory preset if desired; and as appropriate can be augmented by audible or visible indicators of underpressure, overpressure, or other conditions unsuited to safe, clean, reliably optimum operation. Such warning lights, buzzers, or the like responsive to preset threshold conditions in the pneumatic regulation subsystem may be supplemented, or replaced if preferred, by like warning devices connected to respond instead to pressure in the second hydraulic compartment.

That pressure is more directly related to the force at the sealing means, particularly when a hydraulic check valve is in the system as we prefer. It accordingly gives the operator a more direct indication of the condition of the working parts of the machine.

In operation, the operator can review the latter type of readout to help determine whether the machine is ready for various kinds of procedures. The operator can verify, for example, that the sealing means are properly clamped for material-conveying operation—or that they have been released for replacement, or for other disassembly or transportation of the machine.

Alternatively, the target pressure of the regulation subsystem can be very economically and easily made continuously adjustable by the user, and in most cases we prefer to do so. The latter arrangement allows for varying field conditions such as use of different particulate-material grades, different moisture content, different seal materials and so on.

To facilitate such adjustment, an inexpensive manually operated variable regulator and pneumatic gauge are readily included. Such a gauge gives the operator at all times a clear indication of actual pressure in the first hydraulic compartment—though normally he need not adjust it.

For the same reasons outlined above in relation to threshold-type or "go/no-go" warning devices, however, we prefer to include, instead of (or in addition to) the pneumatic gauge, a hydraulic gauge connected to display the pressure in the second hydraulic compartment. If desired, warning devices triggered by extreme conditions—or with adjustable alarm limits if preferred, or both—can still be included in such an adjustable system.

Our invention is applicable and useful to machines of both configurations discussed in the preceding section of this document. We favor, however, practice of our invention in machines of the type disclosed by Frank Reed's patent. To the extent that these devices may be slightly more sensitive than those of the European configuration to incorrect or unbalanced clamping, the benefits of using our invention in these units may possibly be more striking.

We also prefer, in practicing our invention, to provide at least part of the pneumatic vessel and at least part of the first hydraulic compartment together in the form of a single common enclosure. In this arrangement, the pressure-applying means may include a membrane or a floating piston, to separate the air and oil from each other; we now prefer, however, that the pressure-applying means comprise substantially direct contact between the compressed gas and the hydraulic fluid in the single common enclosure.

Conventional wisdom in this area suggests that compressed air, under such circumstances, might tend to dissolve, mix, or become entrained in the hydraulic fluid. We have found somewhat to our own surprise, however, that is such a phenomenon does occur no noticeable problem arises from it. Perhaps the relatively low pneumatic pressures of only about 350 kPa (fifty pounds per square inch) gauge do not favor such mixing, or perhaps the continuing availability of makeup air eventually saturates the oil in the first hydraulic compartment, for the pressure involved.

We also prefer that our invention include auxiliary pneumatic biasing means for controlling the mechanical means to retract the sealing means from the feed structure. We prefer that this system also include control means for selecting application of pressure of the compressed gas from the supply to (a) only the stabilized-pressure-applying means or to (b) only the auxiliary pneumatic biasing means, respectively. Such control means advantageously include a manually operable pneumatic selector valve.

Even if pneumatic regulation is not used for the main clamping system, the above-described hydraulic system may nevertheless be used in combination with auxiliary biasing features—whether of pneumatic character such as just described or otherwise. If so, the hydraulic system with auxiliary biasing may be regarded, for purposes of the appended claims, as auxiliary biasing means for driving the mechanical means to retract the sealing means from the feed structure.

In either case the auxiliary biasing means preferably release the check valve to allow backflow of hydraulic fluid from the second hydraulic compartment toward the first hydraulic compartment to facilitate retraction of the sealing means from the feed structure. For this purpose, we prefer to employ for the check valve a unit of the "pilot" type, in which auxiliary pressure simply applied to a control port lifts the valve core from its seat—thereby allowing backflow as just described.

In conjunction with such an auxiliary biasing system, we prefer that our invention include control means for selecting operation of only the first-mentioned biasing means or only the auxiliary biasing means, respectively. These control means advantageously include a manually operated directional valve that actuates the first-mentioned biasing means or the auxiliary biasing means, respectively.

We shall turn now to the second major aspect of our invention. As mentioned earlier, this second aspect of the invention is capable of implementation independently of the first, and to significant advantage.

As also previously noted, however, we prefer to practice our invention by incorporating both of its aspects together into apparatus; hence, merely to avoid repeating all of the material relating to both aspects, we mean the following summary of the second aspect to serve also as a description of preferred features for use with the first. Conversely, and for the same reason of avoiding redundancy, we mean the preceding summary of the first aspect of the invention to serve also as a description of preferred features for use with the second.

In this second major aspect of our invention, the apparatus includes cam means that act on the sealing means or on the feed structure, or on both, with a significant mechanical advantage. The apparatus also includes hydraulic means for applying force to drive the cam means and to control the amount of force applied by the cam means to press the sealing means against the feed structure.

The foregoing paragraph, together with the common elements of our invention recited earlier (immediately before the discussion of the first major aspect of the invention), may serve as a description of the second aspect of our invention in its broadest or most general form. (For purposes of correlation with the first major aspect of our invention, we note that the cam means here described may be regarded as part of the "mechanical means" that are part of the first major aspect.)

It will be recalled that prior apparatus has made use of cams, and other prior apparatus has made use of hydraulic force application to the sealing means. Despite all the major problems persisting over many years as outlined earlier, however, these two features have not been used together. We believe that we are the first to invent such a combination, and that in view of long-protracted nonuse of such a combination it must have been nonobvious or contrary to the design philosophies of prior artisans in this field.

We consider the use of cams at the final stage advantageous because they appear to isolate the hydraulic system against violent, abrupt force fluctuations or "spikes" which we have observed in systems using other (noncam) mechanical means. We believe that this effect may be due to the relatively high mechanical advantage and especially the inherent resilience at one or two points in a cam drive, or at least in the particular cam drive we employ.

Again, however, the efficacy of our invention is independent of the validity of our theory. Thus this second aspect of the invention even in its broadest form resolves a significant problem.

As before, however, we shall point out several features or characteristics which we prefer to incorporate into the practice of this second form of the invention. Also as before, we include these preferred elements for fullest enjoyment of the advantages of our invention.

We prefer that the cam means comprise a plurality of cams. We also prefer that (in association with this feature) the hydraulic means comprise a plurality of hydraulic actuators, each receiving (and applying) force through a hydraulic fluid to less than all of the plurality of cams, respectively.

When the system includes two hydraulic compartments, an intervening hydraulic line, and a check valve in that line—all as described in connection with the first aspect of our invention—that hydraulic fluid (through which force is applied to the plurality of actuators) is in, or from, the "second hydraulic compartment". In other words, the hydraulic sides of the plural actuators connected in parallel, and the hydraulic line or lines between them and the check valve, form the second hydraulic compartment; but this compartment may also include other lines or chambers.

In particular, in our preferred embodiment each actuator receives hydraulic fluid from the second hydraulic compartment, and each actuator applies force to a respective single one of the plurality of cams. By a "single" cam, however, we refer to a split cam of the type described earlier, in which two separated segments of the cam are mounted at some distance apart along a single cam-driving pin.

The plurality of actuators constitutes plural discrete means for pressing the sealing means against the feed structure at corresponding plural separate positions respectively—and with corresponding respective levels of force. These features together, when the plural cams are advantageously situated to apply forces at different parts of the sealing means respectively, set the stage for the desired balancing or equalization of such forces.

To implement such balancing, the hydraulic elements of the plural hydraulic actuators are simply sized in surface area, in proportion to one another, to deliver substantially equalized force to the plural discrete pressing means, respectively—if equalization is the type of balancing that is desired. If balance with different force levels at different points is desired instead, then the hydraulic surfaces of the plural actuators are instead sized in proportion to one another for delivery of the desired different force levels. The array or structure of force levels is then preserved in proportionality terms, while the absolute forces at the various points shifts with the pressure in the system.

All of the foregoing operational principles and advantages of the present invention will be more fully appreciated upon consideration of the following detailed description, with reference to the appended drawings, of which:

BRIEF DESCRIPTION OF THE DRAWINGS

FIGS. 4 through 10 are adapted from FIGS. 1 through 7, respectively, of the aforesaid Reed '442 patent—and more specifically are identical to those FIGS. 1 through 7, except that all the reference numbers have been changed by addition of a suffix "R", and the identification of all the section lines has been revised as specified parenthetically below;

DETAILED DESCRIPTION OF THE PREFERRED EMBODIMENTS

Portions of the present invention are fully disclosed and illustrated in Frank A. Reed's U.S. Pat. No. 3,161,442, wholly incorporated into this document by reference. Here we shall present details of only the other portions of our invention.

In referring to the components of our invention which are or may be substantially common to the disclosure of that earlier patent, we shall use the same reference numbers used in that patent. In referring to components that are substantially analogous, we shall instead use those earlier reference numbers with a prefix numeral "1", so that for analogous components the numbers in this document will be larger than the earlier reference numbers by one hundred.

In referring to components which are either not seen at all in the earlier disclosure or not assigned reference numbers in it, we shall use reference numbers not used in that patent.

Figure 1:
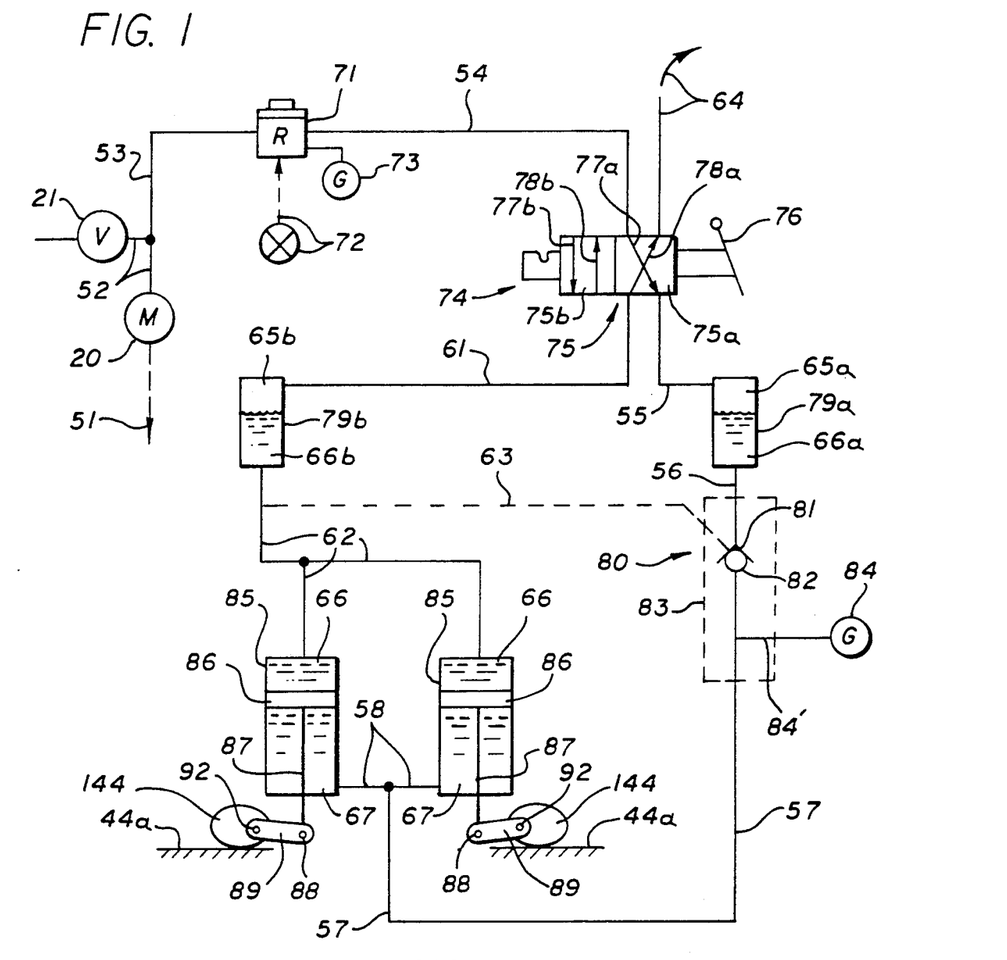
FIG. 1 herein is a schematic of the sealing-means clamping system in a preferred embodiment of our invention.

FIG. 1 shows, at its upper left corner, the valve 21 that is mentioned in the earlier patent at column 2, line 56, and at column 3 line 73. This valve 21, through a high-volume and relatively high-pressure pneumatic line 52, serves as a regulated source of compressed air at a relatively high pressure for operation of an airmotor 20 or the like.

The motor 20 in turn provides a mechanical output in the form of torque at a driveshaft 51, for driving the feed rotor or bowl (30, 31 etc. in the original patent). For present purposes of understanding our invention, that part of its operation, and the feed of material from the hopper 10 out through the outlet hose 49, are substantially the same as disclosed in the earlier patent.

In addition, in our present invention the valve 21 and part of its pneumatic output line 52 are used as a source of a much smaller amount of compressed air, to regulate and balance or equalize the clamping force applied to the sealing means. In the earlier patent the sealing means are called an "orifice face plate" and denoted 43.

We tap the pneumatic output line 52 into a smaller pneumatic line 53 that leads to a lower-pressure regulator 71, set adjustably by a handle or like manual control 72. A gauge 73 permits monitoring the output pressure of the regulator 71.

Air at a regulated pressure established by the regulator 71 then proceeds through another pneumatic line 54 to a four-way selector valve 74, whose core 75 is shifted by a lever 76 or like manual control. Within the core are two pairs of ways 77, 78 for controlling the operating mode of the rest of the system.

In the clamping mode illustrated, supply way 77a through the core 75 applies the regulated pressure to a further pneumatic line 55, which terminates at a clamping-mode accumulator 79a. Return way 78a meanwhile receives exhaust air through one remaining pneumatic line 61 from a release-mode accumulator 79b, and vents the exhaust air to ambient as at 64.

As will be understood, the lever handle 76 can be actuated to shift the core 75 to the right, as schematically shown in the drawing. In that release mode, the relationships are precisely reversed.

More specifically, in the release mode the alternative supply way 77b instead applies the regulated pressure via the pneumatic line 61 just mentioned to the release-mode accumulator 79b. Meanwhile the alternative return way 78b instead receives exhaust air through the pneumatic line 55 from the clamping-mode accumulator 79a, and vents that air to ambient—again as at 64.

Returning to the clamping mode to elaborate further, air 65a at regulated pressure in the clamping-mode accumulator 79a next pressurizes hydraulic fluid such as oil 66a in that accumulator 79a. The effect is to transfer the pressure regulation from the pneumatic to the hydraulic phase. That is to say, the pressurized fluid applies the same regulated pressure through a first hydraulic line 56 to a check valve 80, preferably of the pilot type.

Initially when the remainder of the system is unpressurized, the check valve 80 allows fluid to pass into a second hydraulic line 57—and thereby to a bifurcated hydraulic line 58 that pressurizes the rod sides of two hydraulic cylinders 85 in parallel. Accordingly the pistons 86 and rods 87 of both these cylinders 85 are raised by the pressurized fluid beneath them.

When the rods 87 rise, they operate through pivot connections 88 a corresponding pair of lever arms 89, which are fixed to a pair of cams 144 respectively. These cams then bear forcibly upon a clamping plate 44a, along two opposite edges respectively, to clamp the sealing means discussed earlier. (The clamping plate 44a is also called a "mounting plate" or "hose base plate".)

The manner in which the clamping mechanics are arranged will be described shortly. First, however, we wish to complete our discussion of the control system of FIG. 1.

As pressurization progresses, the gauge 84 displays the rising pressure of hydraulic fluid instantaneously being applied to the rod sides of the actuators or hydraulic cylinders 85. When pressurization in the clamping mode is complete, either the sealing means are forced against the feed structure with the desired pressure or—if the seals are removed from beneath the cams, or if for example the cam-drive system is partly disassembled—the pistons 86 "top out" or run out of travel against the cylinder heads, also with the rated hydraulic pressure established by the pneumatic regulator 71.

The check valve 80 locks the pressure in the second hydraulic lines 57, 58 and the rod sides of the cylinders 85 at the maximum pressure reached by the pneumatic regulator, minus a small, substantially static differential required to operate the check valve itself. Gauge 84 displays the stabilized pressure. Even if the pneumatic regulator pressure later falls (as, for example, if the source pressure is turned off at valve 21), the pistons 86 and rods 87 accordingly remain locked at the maximum pressure for very long periods of time—such as hours or even days—and correspondingly they lock the level of force applied to the sealing means.

Substantially this condition continues unless the system is switched to the release mode, by operation of the valve lever handle 76 as previously described. Thereupon air at the same regulated pressure flows to pressurize the release-mode accumulator 79b, while pressure in the clamping-mode regulator 79a is relieved to ambient.

Upon pressurization of air 65b in the release-mode accumulator 79b, pressure is transferred to the hydraulic fluid 66b in that accumulator. Hydraulic pressure in its outlet line 62 is then applied to pressurize the head sides of the two hydraulic actuators or cylinders 85.

Initially, however, the pistons 86 and rods 87 do not move significantly, because the pressure in the rod sides of the cylinders 85 remains locked by the check valve 80 as before. To unlock the check valve, hydraulic pressure is tapped off in a cross-connection hydraulic line 63 from the main release-mode hydraulic line 62, for application to the pilot port of the pilot check valve 80.

Pressure in this line is slightly higher than that in the second hydraulic line in the clamping-mode side of the circuit, because there is no check valve in the release side to cause a differential of the sort mentioned above. Thus the gauge 84 displays briefly a slightly rising pressure.

When the tapped-off pressure in the auxiliary cross connection 63 rises sufficiently, it raises the check-valve core or "ball" 82 from its seat 81—allowing hydraulic fluid 67 to flow from the rod sides of the actuators 85 back through the lines 58, 57 and 56 into the clamping-mode accumulator 79a. The rising fluid 66a in this accumulator forces some of the air 65a back out through the pneumatic line 55 and through the valve to ambient as earlier detailed.

The pistons 86 and rods 87 then drive the pivots 88, levers 89 and cams 144 fully away from the clamping plates 44a. This action releases the clamping force and also allows ample clearance for easy removal or replacement of the clamping plates—or, if desired, simply for transportation of the system to another site without pad damage.

Figure 2:
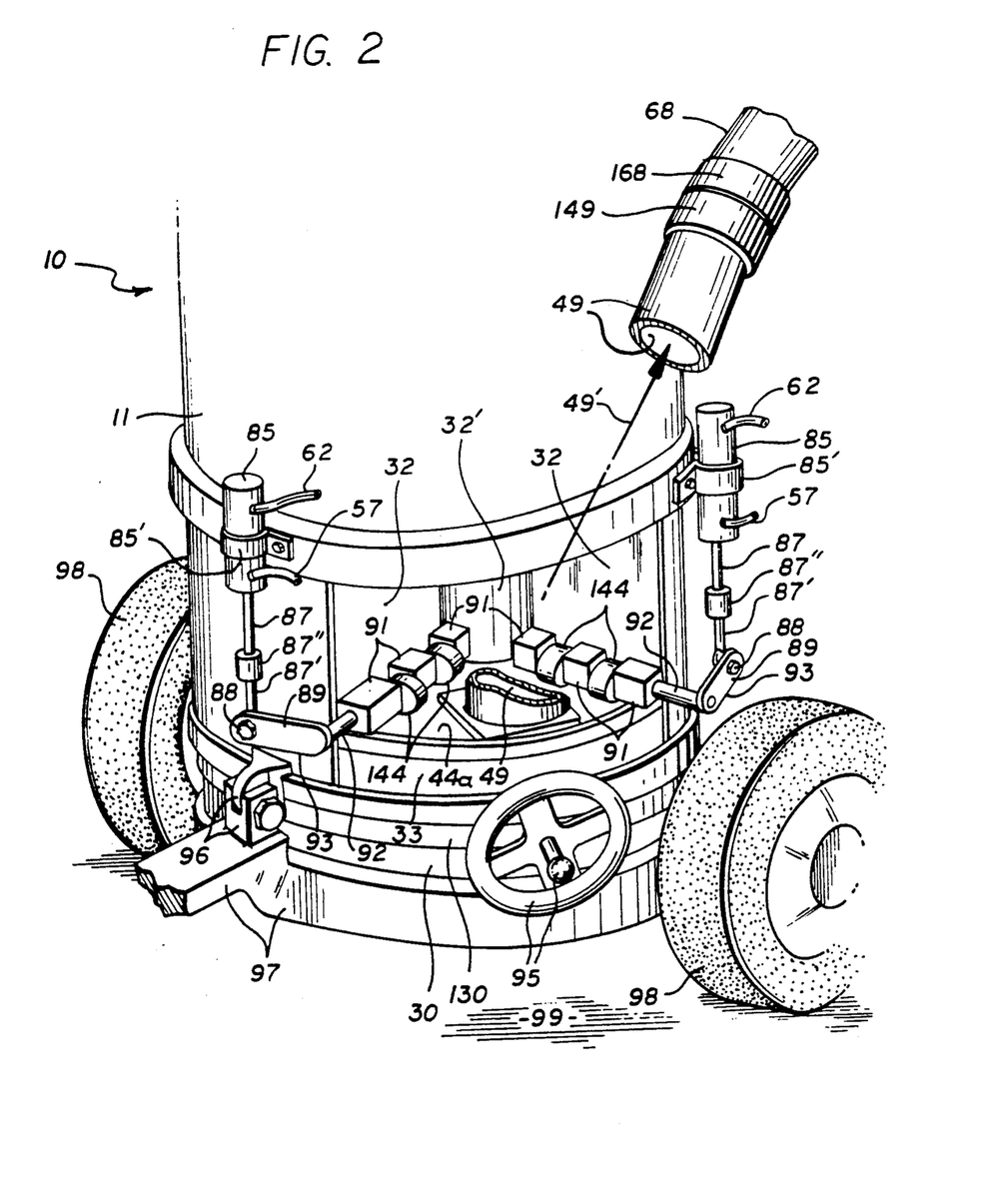
FIG. 2 herein is a perspective drawing showing the hydraulic actuators and cam means of the FIG. 1 embodiment illustrated as transported on mobile support means to a delivery site, and with a delivery hose that is shown in use for carrying material to a deposition point at the site.

We shall now discuss more fully the mechanical arrangements in the area of the cams 144 and mounting plate or hose base plate 44a. FIGS. 1 and 2 both show the hose base plate 44a that is mentioned in the Reed patent at column 3, line 27 and illustrated in FIGS. 6 and 7 of that patent.

Modernly it is preferred to make the hose base plate in two separate pieces. One of these is a relatively thin metal plate to which a rubber seal (the "orifice face plate" 43 of the Reed patent) is vulcanized generally as suggested in FIG. 6 of that earlier patent. This piece is thus a temporary item, somewhat akin to the backing of a brake shoe—that is to say, it is put into place in the gun, and later removed from the gun, with the seal.

The second piece forms a permanent part of the housing of the machine, and carries attached the inlet and outlet hoses 48, 49 as represented in FIG. 7 of the earlier patent. Both these pieces are designated "44a" in FIGS. 6 and 7 of that patent, but nowadays they are two separate items.

In FIGS. 1 and 2 of this present document, only one of those two pieces appears—namely, the permanent element that is more readily regarded as part of the machine. Thus these current drawings are somewhat more directly compatible with FIG. 7 than with FIG. 6 of the earlier patent, in this particular regard. As will be understood, however, with the foregoing explanation of this minor point the related disclosure of the earlier patent remains substantially current.

In FIG. 2 of this document, for purposes of clarity in showing the components of particular interest, the outlet hose 49 has been drawn broken away and in two separate sections—joined symbolically by an arrow 49' in the broken line. For the same reason, the inlet hose (48 in the original patent) has been omitted entirely from the drawing, but in the actual apparatus is present and is mounted to the housing plate 44a substantially as shown in FIG. 7 of the earlier patent.

The forty-five-degree housing 32 is shown in FIG. 2 in somewhat greater detail than previously. It has a rear wall segment 32' that is generally a cylindrical sector and that intersects, in two vertical corners, the two mutually angled vertical planar segments 32.

In our present invention the clamping screws 44 with their brackets (FIG. 7 of the original patent) have been eliminated, and instead the analogous function is performed by cams 144—as shown in both FIGS. 1 and 2 of this present document. That is, cams 144 press on the housing plate 44a, which in turn drives the "orifice plate" or seal 43 (shown in the earlier patent) in a rubbing contact against the top of the feed rotor or bowl 30, 31 etc.

Instead of the clamping-screw brackets, our invention provides three mounting blocks 91 secured as by welding to each of the two vertical planar walls 32 of the forty-five-degree housing. Journalled through all three blocks 91 at each side is a respective single camshaft 92, which rotates freely in the corresponding set of mounting blocks 91.

The cams 144 are fixed onto (and may be keyed to) the camshafts 92, between the mounting blocks 91, and ride with those shafts. Since both of the cams 144 at each side of the forty-five-degree housing 32 are mutually fixed in angular relation to each other, we prefer to regard the two cams at each side as split or separated segments of a single cam—so that in this way of thinking about the structure there are just two cams, one at each side of the housing 32.

At their outboard ends the two camshafts 92 are driven by levers 89, which are respectively secured as by welds 93 to the shafts 92. These levers 89 in turn are driven through pivoting connections, using bolts 88 or the like, by the pistons 87 of respective hydraulic cylinders 85.

The pistons 87 are connected to the pivots 88 through suitable extensions 87' and couplings 87" at each side respectively. The pistons 87 in turn are powered and controlled bidirectionally by hydraulic fluid forced in or out through upper and lower hydraulic lines or hoses 62, 57—and the control of these hydraulic flows is as described fully earlier in reference to FIG. 1.

In a prototype unit in which hydraulic-cylinder pistons 87 drove the sealing-means clamping directly, we observed pressure spikes at the gauge 84 as high as 10 MPa (1500 pounds per square inch). We presume that these fluctuations were due to the violent fluctuation of forces at the seals—probably as individual pieces of gravel or the like were caught and broken apart between the leading edge of the seal and the trailing edges of the pockets in the bowls.

These observed pressure readings were accompanied by violent flexure of the cylinder manifold 58, hose 57 expansion, and also possibly compression of the hydraulic fluid 67 etc. We considered these effects deleterious to reliable, protracted operation.

We have found that our use of cams 144 and levers 89, rotating together about fixed pivots 92, advantageously prevents transmission of those violent pressure variations back into the hydraulic system. This advantageous isolation of the hydraulic system from force fluctuations at the seals may be due to the relatively high mechanical advantage in the cam and cam lever, and possibly also to inertia and slight "stiction" (tendency to bind) of the cams.

If so, comparable or higher mechanical advantage and stiction, and thereby force isolation, could likely be obtained using—instead of the cams or the levers, or both—other known devices with comparable properties. Such devices might include threaded studs or leadscrews, worm drives etc.; however, we have not tested such substitutes.

Our FIG. 2 shows—besides various details illustrated in the Reed patent—a fitting 149 on the outlet hose 49 and a mating fitting 168 of a delivery tube 68, for carrying the material from the hose 49 to a depositon point in a delivery site 99. The entire apparatus is preferably carried to such a site 99 on an automotive trailer or cart, which has a pull tongue and base 97, wheels 98, etc.

The accumulators 79a, 79b of FIG. 1 are simply chambers in which air 65a, 65b contacts hydraulic fluid (usually oil) 66a, 66b respectively. Suitable chambers may be made from short sections of ordinary pipe roughly eleven centimeters (4½ inches) long and six centimeters (2¼ inches) in inside diameter, with cylindrical end caps welded into place.

Each top cap should be drilled and tapped for a 1¼-to-2-cm (half-to-three-quarters inch) inside-diameter fitting, as convenient for receiving a narrow end of a funnel for use in filling the chamber with oil. The cylindrical side wall near the top and bottom (or if preferred the caps) should be drilled and tapped for smaller fittings—for example, half-centimeter (quarter-inch) outside-diameter threaded fittings—for attachment of the pneumatic line 55 or 61 at the top and the hydraulic line 56 or 62 respectively at the bottom.

We wish to make absolutely clear that the dimensions stated above are somewhat arbitrary and arose as a matter of convenience or expediency. As a practical matter each chamber may be made of any convenient materials and in any configuration capable of withstanding the pressures involved—with allowance for excess pressures that may arise on a transient basis—and adequate to accommodate the fluctuating liquid levels that will be encountered in practice.

The volume of each chamber 79a, 79b is very roughly 300 milliliters (1¼ cups), and we prefer to operate each around half full. The exact level is not at all important, provided only that the liquid level preferably remains within the chamber over the full range of operation of the system (that is to say, from fully released to fully clamped).

We consider this latter limitation desirable to avoid back-exhaust of oil, and otherwise generally for orderly operation of the system. In testing for compliance with this limitation, we believe that it is desirable to allow for extremes that may arise under startup, shutdown, and other transient conditions.

More specifically, with the pistons 86 fully down (released), we prefer to place enough oil in the clamping-mode side of the system (that is, the clamping-mode accumulator 79a, the hydraulic lines 56-57-58, and the minimal volume 67 under the pistons 86) so that the clamping-side chamber 79a is roughly half full. Similarly we place enough oil in the release-mode side of the system (the release-mode accumulator 79b, the hydraulic lines 62-63, and the maximum volumes 66 above the pistons) so that the release-side chamber 79b is roughly half full. In practice this operating condition is attained by putting very roughly 180 milliliters (three-quarters cup) of oil, or less, into each side of the system.

If preferred, a separating device such as a floating piston or a bladder could be mounted within each accumulator chamber 79a, 79b to separate the oil from the air in known ways. At least so far, however, we have not found any such separation necessary or desirable.

In principle it would be possible to use only one accumulator, rather than the two units 79a, 79b illustrated and discussed. In such a system, all pneumatic and hydraulic pressure could simply be released to ambient in the release mode, and the cams 144 retracted by springs or the like (not shown).

In such a system, clamping force would first have to overcome the spring force before beginning to press the seals against the bowl or wear plate. Some fluctuation in sealing pressure might then result dynamically, with vibration of the springs.

That fluctuation might be undesirable. On the other hand, the springs might have a tendency to absorb the violent fluctuations in force that arise in the rubbing contact, previously discussed—and, if so, possibly the cams 144 and levers 89 might be omitted. Without fully exploring these possibilities, which we believe are within the scope of certain of the appended claims, we have selected the dual-accumulator system simply because we have found its performance excellent.

For mounting of the pilot check valve 80 and gauge 84, we prefer to prepare a small metal block 83 with several drilled and tapped holes converging to a central through-channel that actually contains the valve 80 (held in place by a threaded retainer). If the system were constructed exactly as shown in FIG. 1, with the hydraulic line 62 in the release-mode side of the system connected by a "T" junction to the cross-connection line 63, then the block would require only four holes.

Those would be: a first line 56 from the clamping-mode accumulator 79a, a second line 57 to the actuator manifold 58 and actuators 85, a third that receives the cross-connection 63 from the release-mode side of the system, and a fourth 84' to the pressure gauge 84. Such a construction would be entirely workable and would be quite satisfactory.

In practice, however, we prefer to provide finally a fifth line (not shown) into the block 80, so that the hydraulic line 62 on the release-mode side of the system can actually be split at the cross-connection point on the diagram. Each portion of that line 62 (one above and one below the cross-connection) then is separately connected to the mounting block.

The cross-connection line 63 is then entirely within the block 80, eliminating the need for a "T" connection in the release-mode hydraulic line 62. Each of the five holes is of suitable diameter to accommodate one of the five hydraulic lines respectively.

Similarly, as will be appreciated, the bifurcated hydraulic lines to the two actuator cylinders 85 could also be connected directly to the block 80; but in these cases the tubing or hose connections required would be relatively longer, rendering the extra long runs of tubing relatively undesirable. We accordingly prefer to use "T" junctions at those two bifurcation points, as diagrammed in FIG. 1.

For the hydraulic actuators 85 we have selected brass cylinders that are commercially available from Aurora Air Products Inc., of Aurora, Ill., under that vendor's designation "Series HB"—and more particularly the 3.8-cm (1½-inch) models within that line. For the check valve 80 we use a single pilot type, designated model SPC2-16X-P-XXX, of the Modular Controls Company.

Any conveniently available actuators and check valve, however, are likely to serve well, if they are capable of operating under the pressures and high-vibration conditions encountered with gunite guns and the like. If the check valve 80 is not of the pilot type, however, then suitable valving should preferably be provided—either within or under control of the selector valve 74—for release-mode venting of that portion 57-58-67 of the clamping side of the system whose pressure is locked by the check valve.

Similarly any of a great variety of pneumatic regulators can be used. Most or all such regulators include some biasing means—such as a spring. Those biasing means provide a calibrated force against which the pressure in the regulated side of the system is tested, and to which the regulator continuously adjusts or regulates that pressure.

At this point it is possible to appreciate conceptually or abstractly the function of the components that follow the regulator, in relation to the biasing means in the regulator. Those pneumatic, hydraulic and mechanical components 79a-80-85-89-144-44a as a group serve in effect to transform the mechanical impedance of the biasing means in the regulator so as to be capable of driving the housing portions 44a. This impedance transformation is effected while retaining the calibrated character of the biasing means.

It is essentially for this reason that the precise character of the regulator is somewhat immaterial—as long as it provides reliable regulation under the rigorous field conditions noted earlier. By the same token, we believe that regulation of clamping force through the use of other biasing means, whether or not requiring such impedance transformation, is within the scope of certain of our appended claims.

The hopper 10 with attached forty-five-degree housing 32, cams 144, and hydraulic cylinders or actuators 85, is preferably mounted by a hinge 96 at the forward end of the cart base 97. At its remote side the hopper is locked down by a pair of spaced-apart simple safety fasteners (not shown) as well as a conventional pin-and-lockwheel mechanism 95 or any suitable equivalent.

The hopper 10 and all its attachments are readily unlocked and swung away from the bowl 30 or wear plate 130 on the hinge 96; and then after, for example, servicing of those exposed components are simply swung back into position and locked down. This is permissible by virtue of the mounting of the actuators 85, linkages 87-88-89 and cams 144 together on the housing 32—which is to say, on the hopper 10—and by virtue of the capability of these elements to run fully against either end of their travel hydraulically without the slightest damage or impairment of force calibration.

To avoid damaging the cams, we do prefer to operate the clamping system into its release mode before unlocking the hopper 10 as just described. We similarly prefer to lock the hopper down again before restoring the clamping system to its clamping mode.

In practice our clamping system can be turned off and the pressure fully released within about ten seconds, for servicing as just described or for replacement of the seals or "pads"; and after such servicing or pad replacement the clamping system can be turned back on and the pressure fully restored within about five seconds. Including the time required to remove the pad 43 itself and substitute a new one, complete pad changeout can be performed in only about twenty seconds.

When the two (or more) hydraulic cylinders 85 and their operating pistons 86 are of equal hydraulic cross-sectional area (deducting, in the clamping mode, for the areas of the rods 87), they develop and apply substantially equal force to the levers 89 and cams 144. This produces force balancing of the equalization type, as mentioned earlier.

Figure 3:
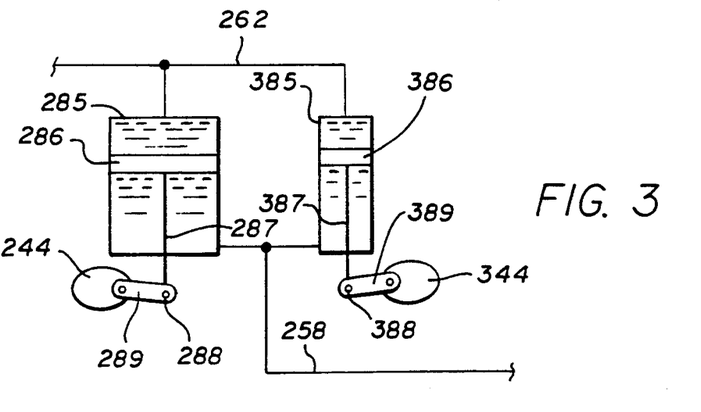
FIG. 3 herein is a schematic drawing of part of another embodiment, for use in applying—to different parts of the sealing means—forces that are balanced but not equalized.

When force balancing calls for unequal forces instead, the two (or more) cylinders 285, 385 (FIG. 3) and their pistons 286, 386 can be made of correspondingly unequal hydraulic areas, in proportion to the forces desired. Alternatively, if preferred all or part of the desired force variation may be provided by making the lever arms 289, 389 of unequal length; or by making the cams 244, 344 with unequal effective working radii—or any combination of the three variables may be employed, all as well known in the hydraulic and mechanical arts.

Thus our invention may resolve the earlier-mentioned need for—as an example—heavier or lighter forces at trailing vs. leading edges of the seals. To effectuate such a resolution the manufacturer of the machinery must first determine, by straightforward trial-and-error experimentation, where forces should be heavier, and where lighter, and in what proportion. The manufacturer can then implement this proportion in terms of unequal areas, arm lengths, or cam radii—or combinations of those variables—as preferred.

We have estimated that the overall cost of a machine in accordance with our invention, if it is a machine of the Reed configuration that would have or would use a source of compressed air anyway, is actually lower than the cost of a similar machine with the mechanical clamping system (handles, sprockets, chains, and studs in a grease-packed, sealed housing) previously in use. Components and grease for that earlier system, described in the "PRIOR ART" section of this document, currently cost some $600, whereas the control-system components of our present invention come to only about $550.

It will be understood that the foregoing disclosure is intended to be merely exemplary, and not to limit the scope of the invention—which is to be determined by reference to the appended claims.

We claim:

1. Apparatus for conveying particulate material such as gunite from a hopper to a delivery tube, and comprising:

means defining a receiving port for receiving such material from such a hopper;

means defining a discharge port for discharge of such material into such a delivery tube;

feed structure mounted for rotation and defining at least one chamber for receiving such material from the receiving port and for carrying received material by said rotation to the discharge port for discharge;

pneumatic means, defining and including a pneumatic supply orifice, for applying gas to blow material from the feed structure into the discharge port;

sealing means for substantially sealing a pneumatic path defined by the pneumatic supply orifice, the discharge port, such tube, and at least one chamber when generally in position for said discharge;

mechanical means for applying force to press the sealing means against the feed structure;

biasing means for applying a substantially regulated level of force to drive the mechanical means and to substantially stabilize the level of force applied by the mechanical means to press the sealing means against the feed structure.

2. The apparatus of claim 1, wherein the biasing means comprise:

hydraulic means for applying force to drive the mechanical means and to control the level of force applied to press the sealing means against the feed structure; and substantially regulated means for substantially stabilizing the amount of force applied by the hydraulic means to the mechanical means.

3. Apparatus for conveying particulate material such as gunite from a hopper to a delivery tube, and comprising:

means defining a receiving port for receiving such material from such a hopper;

means defining a discharge port for discharge of such material into such a delivery tube;

feed structure mounted for rotation and defining at least one chamber for receiving such material from the receiving port and for carrying received material by said rotation to the discharge port for discharge;

pneumatic means, defining and including a pneumatic supply orifice, for applying gas to blow material from the feed structure into the discharge port;

sealing means for substantially sealing a pneumatic path defined by the pneumatic supply orifice, the discharge port, such tube when present, and at least one chamber when generally in position for said discharge;

mechanical means for applying force to press the sealing means against the feed structure;

biasing means for applying a substantially regulated level of force to drive the mechanical means and to substantially stabilize the level of force applied by the mechanical means to press the sealing means against the feed structure;

wherein the biasing means comprise:

hydraulic means for applying force to drive the mechanical means and to control the level of force applied to press the sealing means against the feed structure, and substantially regulated means for substantially stabilizing the amount of force applied by the hydraulic means to the mechanical means; and wherein the hydraulic means, comprised by the biasing means, comprise:

a first hydraulic compartment for holding hydraulic fluid at a pressure controlled by the substantially regulated means, a second hydraulic compartment for receiving hydraulic fluid at said controlled pressure from the first hydraulic compartment, and for holding hydraulic fluid in contact with at least one hydraulic actuator that applies force to the mechanical means, a hydraulic line for delivering hydraulic fluid from the first hydraulic compartment to the second hydraulic compartment, and a check valve in the hydraulic line, for deterring backflow of hydraulic fluid from the second hydraulic compartment to the first hydraulic compartment.

4. The apparatus of claim 3, wherein the substantially regulated means comprise:

a supply of compressed gas;

at least one pneumatic vessel for receiving compressed gas from the supply;

a pneumatic pressure regulator for substantially stabilizing the pressure of the gas in the pneumatic vessel; and means for applying substantially stabilized pressure from the compressed gas in the pneumatic vessel to the hydraulic fluid in the first hydraulic compartment.

5. The apparatus of claim 4, for depositing such particulate material at a deposition point in a delivery site for such material; said apparatus further comprising:

a hopper for containing such material;

motor means, connected to drive the feed structure in rotation;

mobile support means, secured to the hopper, motor means, and feed structure for use in transporting the apparatus to such delivery site; and a delivery hose, communicating with the discharge port, for carrying material from the discharge port to such a deposition point.

6. The apparatus of claim 4, wherein:

the at least one chamber in the feed structure is a generally U-shaped pocket that has two ends both open toward the sealing means; and the pneumatic means apply compressed gas in through the sealing means to the generally U-shaped pocket, to blow material from the generally U-shaped pocket out through the sealing means to the discharge port.

7. The apparatus of claim 4, wherein:

at least part of the pneumatic vessel and at least part of the first hydraulic compartment are a single common enclosure; and the pressure-applying means comprise substantially direct contact between the compressed gas and the hydraulic fluid in the single common enclosure.

8. The apparatus of claim 7, wherein the mechanical means comprise cam means that act with a significant mechanical advantage.

9. The apparatus of claim 8, wherein the cam means comprise a plurality of cams.

10. The apparatus of claim 9, wherein the hydraulic means comprise a plurality of hydraulic actuators, each receiving hydraulic fluid from the second hydraulic compartment and each applying force to less than all of the plurality of cams, respectively.

11. The apparatus of claim 9, wherein the hydraulic means comprise a plurality of hydraulic actuators, each receiving hydraulic fluid from the second hydraulic compartment and each applying force to a respective single one of the plurality of cams.

12. The apparatus of claim 4, further comprising:

auxiliary pneumatic biasing means for controlling the mechanical means to retract the sealing means from the feed structure;

control means for selecting application of pressure of the compressed gas from the supply to (a) only the stabilized-pressure-applying means or to (b) only the auxiliary pneumatic biasing means, respectively.

13. The apparatus of claim 12, wherein the control means comprise a manually operable pneumatic selector valve.

14. The apparatus of claim 3, for depositing such particulate material at a deposition point in a delivery site for such material; said apparatus further comprising:

a hopper for containing such material;

motor means, connected to drive the feed structure in rotation;

mobile support means, secured to the hopper, motor means, and feed structure for use in transporting the apparatus to such delivery site; and a delivery hose, communicating with the discharge port, for carrying material from the discharge port to such a deposition point.

15. The apparatus of claim 3, wherein:

the at least one chamber in the feed structure is a generally U-shaped pocket that has two ends both open toward the sealing means; and the pneumatic means apply compressed gas in through the sealing means to the generally U-shaped pocket, to blow material from the generally U-shaped pocket out through the sealing means to the discharge port.

16. The apparatus of claim 3, further comprising:

auxiliary biasing means for driving the mechanical means to retract the sealing means from the feed structure;

wherein the auxiliary biasing means release the check valve to allow backflow of hydraulic fluid from the second hydraulic compartment toward the first hydraulic compartment to facilitate retraction of the sealing means from the feed structure.

17. The apparatus of claim 16, further comprising:

control means for selecting operation of only the first-mentioned biasing means or only the auxiliary biasing means, respectively.

18. The apparatus of claim 17, wherein the control means comprise a manually operated directional valve that actuates the first-mentioned biasing means or the auxiliary biasing means, respectively.

19. The apparatus of claim 2, wherein:

the at least one chamber in the feed structure is a generally U-shaped pocket that has two ends both open toward the sealing means; and the pneumatic means apply compressed gas in through the sealing means to the generally U-shaped pocket, to blow material from the generally U-shaped pocket out through the sealing means to the discharge port.

20. The apparatus of claim 2, further comprising:

auxiliary biasing means for driving the mechanical means to retract the sealing means from the feed structure.

21. Apparatus for conveying particulate material such as gunite from a hopper to a delivery tube, and comprising:

means defining a receiving port for receiving such material from such a hopper;

means defining a discharge port for discharge of such material into such a delivery tube;

feed structure mounted for rotation and defining at least one chamber for receiving such material from the receiving port and for carrying received material by said rotation to the discharge port for discharge;

pneumatic means, defining and including a pneumatic supply orifice, for applying gas to blow material from the feed structure into the discharge port;

sealing means for substantially sealing a pneumatic path defined by the pneumatic supply orifice, the discharge port, such tube when present, and at least one chamber when generally in position for said discharge;

mechanical means for applying force to press the sealing means against the feed structure;

biasing means for applying a substantially regulated level of force to drive the mechanical means and to substantially stabilize the level of force applied by the mechanical means to press the sealing means against the feed structure;

wherein the biasing means comprise:

hydraulic means for applying force to drive the mechanical means and to control the level of force applied to press the sealing means against the feed structure, and substantially regulated means for substantially stabilizing the amount of force applied by the hydraulic means to the mechanical means; and wherein the substantially regulated means, comprised by the biasing means, comprise:

a supply of compressed gas;

at least one pneumatic vessel for receiving compressed gas from the supply;

a pneumatic pressure regulator for substantially stabilizing the pressure of the gas in the pneumatic vessel; and means for applying substantially stabilized pressure from the compressed gas in the pneumatic vessel to the hydraulic means.

22. The apparatus of claim 21, wherein:

the hydraulic means comprise at least one hydraulic compartment for containing hydraulic fluid;

at least part of the pneumatic vessel and at least part of the hydraulic compartment are a single common enclosure; and the pressure-applying means comprise substantially direct contact between the compressed gas and the hydraulic fluid in the single common enclosure.

23. The apparatus of claim 22, for depositing such particulate material at a deposition point in a delivery site for such material; said apparatus further comprising:

a hopper for containing such material;

motor means, connected to drive the feed structure in rotation;

mobile support means, secured to the hopper, motor means, and feed structure for use in transporting the apparatus to such delivery site; and a delivery hose, communicating with the discharge port, for carrying material from the discharge port to such a deposition point.

24. The apparatus of claim 21, for depositing such particulate material at a deposition point in a delivery site for such material; said apparatus further comprising:

a hopper for containing such material;

motor means, connected to drive the feed structure in rotation;

mobile support means, secured to the hopper, motor means, and feed structure for use in transporting the apparatus to such delivery site; and a delivery hose, communicating with the discharge port, for carrying material from the discharge port to such a deposition point.

25. The apparatus of claim 1, wherein:

the at least one chamber in the feed structure is a generally U-shaped pocket that has two ends both open toward the sealing means; and the pneumatic means apply compressed gas in through the sealing means to the generally U-shaped pocket, to blow material from the generally U-shaped pocket out through the sealing means to the discharge port.

26. The apparatus of claim 1, wherein:

the mechanical means comprise plural discrete means for pressing the sealing means against the feed structure at corresponding plural separate positions respectively, and with corresponding respective levels of force; and the biasing means comprise means for substantially balancing the levels of force with which the mechanical means respectively press the sealing means at said plural positions respectively.

27. The apparatus of claim 26, wherein:

the biasing means comprise hydraulic means for applying force to drive the mechanical means and to control the levels of force applied to press the sealing means against the feed wheel; and the hydraulic means comprise plural hydraulic actuators operated from a substantially common hydraulic pressure, to drive the plural discrete pressing means respectively and to substantially balance the levels of force with which the plural discrete pressing means press the sealing means at said plural positions respectively.

28. The apparatus of claim 27, wherein the plural hydraulic actuators are sized to deliver substantially equalized force to the plural discrete pressing means, respectively.

29. The apparatus of claim 26, wherein the biasing means comprise means for substantially equalizing the levels of force with which the mechanical means respectively press the sealing means at said plural positions respectively.

30. Apparatus for conveying particulate material such as gunite from a hopper to a delivery tube, and comprising:

means defining a receiving port for receiving such material from such a hopper;

means defining a discharge port for discharge of such material into such a delivery tube;

feed structure mounted for rotation and defining at least one chamber for receiving such material from the receiving port and for carrying received material by said rotation to the discharge port for discharge;

pneumatic means, defining and including a pneumatic supply orifice, for applying gas to blow material from the feed structure into the discharge port;

sealing means for substantially sealing a pneumatic path defined by the pneumatic supply orifice, the discharge port, such tube, and at least one chamber when generally in position for said discharge;

cam means for applying force to press the sealing means against the feed structure; said cam means acting with a significant mechanical advantage; and hydraulic means for applying force to drive the cam means and to control the amount of force applied by the cam means to press the sealing means against the feed structure.

31. The apparatus of claim 30, wherein the cam means comprise a plurality of cams.

32. Apparatus for conveying particulate material such as gunite from a hopper to a delivery tube, and comprising:

means defining a receiving port for receiving such material from such a hopper;

means defining a discharge port for discharge of such material into such a delivery tube;

feed structure mounted for rotation and defining at least one chamber for receiving such material from the receiving port and for carrying received material by said rotation to the discharge port for discharge;

pneumatic means, defining and including a pneumatic supply orifice, for applying gas to blow material from the feed structure into the discharge port;

sealing means for substantially sealing a pneumatic path defined by the pneumatic supply orifice, the discharge port, such tube when present, and at least one chamber when generally in position for said discharge;

cam means, comprising a plurality of cams, for applying force to press the sealing pad against the feed structure; said cam means acting on the sealing means or on the feed structure, or on both, with a significant mechanical advantage; and hydraulic means for applying force to drive the cam means and to control the amount of force applied by the cam means to press the sealing means against the feed structure; said hydraulic means comprising a plurality of hydraulic actuators, each applying force through a hydraulic fluid to less than all of the plurality of cams, respectively.

33. The apparatus of claim 32, wherein the hydraulic means comprise:

a first hydraulic compartment for holding hydraulic fluid under pressure within the first hydraulic compartment;

a second hydraulic compartment for receiving hydraulic fluid at said pressure from the first hydraulic compartment, and for holding hydraulic fluid to drive at least one of the hydraulic actuators to apply force to the cam means;

a hydraulic line for delivering hydraulic fluid from the first hydraulic compartment to the second hydraulic compartment; and a check valve in the hydraulic line, for deterring backflow of hydraulic fluid from the second hydraulic compartment to the first hydraulic compartment.

34. The apparatus of claim 33, wherein:

the at least one chamber in the feed structure is a generally U-shaped pocket that has two ends both open toward the sealing means; and the pneumatic means apply compressed gas in through the sealing means to the generally U-shaped pocket, to blow material from the generally U-shaped pocket out through the sealing means to the discharge port.

35. The apparatus of claim 34, for depositing such particulate material at a deposition point in a delivery site for such material; said apparatus further comprising:
- a hopper for containing such material;
- motor means, connected to drive the feed structure in rotation;
- mobile support means, secured to the hopper, motor means, and feed structure for use in transporting the apparatus to such delivery site; and
- a delivery hose, communicating with the discharge port, for carrying material from the discharge port to such a deposition point.

36. The apparatus of claim 32, wherein:
- the plurality of cams presses the sealing means against the feed structure at corresponding plural separate positions respectively, and with corresponding respective levels of force; and
- a substantially common hydraulic pressure is applied to operate the plural hydraulic actuators, to drive the plurality of cams respectively and to substantially balance the levels of force with which the plurality of cams presses the sealing means at said plural positions respectively.

37. The apparatus of claim 36, wherein:
- the plural hydraulic actuators are sized to deliver substantially equalized force to the plural discrete pressing means, respectively;
- whereby the levels of force with which the plurality of cams respectively presses the sealing means are substantially equalized.

38. The apparatus of claim 31, wherein: the hydraulic means comprise a plurality of hydraulic actuators, each applying force through a hydraulic fluid to a respective single one of the plurality of cams.

39. Apparatus for conveying particulate material such as gunite from a hopper to a delivery tube, and comprising:
- means defining a receiving port for receiving such material from such a hopper;
- means defining a discharge port for discharge of such material into such a delivery tube;
- feed structure mounted for rotation and defining at least one chamber for receiving such material from the receiving port and for carrying received material by said rotation to the discharge port for discharge;
- pneumatic means, defining and including a pneumatic supply orifice, for applying gas to blow material from the feed structure into the discharge port;
- sealing means for substantially sealing a pneumatic path defined by the pneumatic supply orifice, the discharge port, such tube when present, and at least one chamber when generally in position for said discharge;
- cam means for applying force to press the sealing pad against the feed structure; said cam means acting on the sealing means or on the feed structure, or on both, with a significant mechanical advantage; and
- hydraulic means for applying force to drive the cam means and to control the amount of force applied by the cam means to press the sealing means against the feed structure;
- wherein the hydraulic means comprise:
  - a first hydraulic compartment for holding hydraulic fluid under pressure within the first hydraulic compartment;
  - at least one hydraulic actuator for applying force to the cam means;
  - a second hydraulic compartment for receiving hydraulic fluid at said pressure from the first hydraulic compartment, and for holding hydraulic fluid to drive the at least one hydraulic actuator to apply force to the cam means;
  - a hydraulic line for delivering hydraulic fluid from the first hydraulic compartment to the second hydraulic compartment; and
  - a check valve in the hydraulic line, for deterring backflow of hydraulic fluid from the second hydraulic compartment to the first hydraulic compartment.

40. The apparatus of claim 39, further comprising:
- substantially regulated means for substantially stabilizing said pressure of fluid in the first hydraulic compartment and substantially stabilizing, through the hydraulic fluid, force applied from the second hydraulic compartment to the cam means.

41. The apparatus of claim 40, wherein the substantially regulated means comprise:
- a supply of compressed gas;
- at least one pneumatic vessel for receiving compressed gas from the supply;
- a pneumatic pressure regulator for substantially stabilizing the pressure of the gas in the pneumatic vessel; and
- means for applying substantially stabilized pressure from the compressed gas in the pneumatic vessel to hydraulic fluid in the first hydraulic compartment.

42. The apparatus of claim 41, wherein:
- at least part of the pneumatic vessel and at least part of the first hydraulic compartment are a single common enclosure; and
- the pressure-applying means comprise substantially direct contact between the compressed gas and the hydraulic fluid in the single common enclosure.

43. The apparatus of claim 39, wherein:
- the at least one chamber in the feed structure is a generally U-shaped pocket that has two ends both open toward the sealing means; and
- the pneumatic means apply compressed gas in through the sealing means to the generally U-shaped pocket, to blow material from the generally U-shaped pocket out through the sealing means to the discharge port.

44. The apparatus of claim 43, for depositing such particulate material at a deposition point in a delivery site for such material; said apparatus further comprising:
- a hopper for containing such material;
- motor means, connected to drive the feed structure in rotation;
- mobile support means, secured to the hopper, motor means, and feed structure for use in transporting the apparatus to such delivery site; and
- a delivery hose, communicating with the discharge port, for carrying material from the discharge port to such a deposition point.

45. The apparatus of claim 30, further comprising:
- substantially regulated means for substantially stabilizing the amount of force applied by the hydraulic means to the cam means.

46. Apparatus for conveying particulate material such as gunite from a hopper to a delivery tube, and comprising:
- means defining a receiving port for receiving such material from such a hopper;
- means defining a discharge port for discharge of such material into such a delivery tube;

feed structure mounted for rotation and defining at least one chamber for receiving such material from the receiving port and for carrying received material by said rotation to the discharge port for discharge;

pneumatic means, defining and including a pneumatic supply orifice, for applying gas to blow material from the feed structure into the discharge port;

sealing means for substantially sealing a pneumatic path defined by the pneumatic supply orifice, the discharge port, such tube when present, and at least one chamber when generally in position for said discharge;

cam means for applying force to press the sealing pad against the feed structure; said cam means acting on the sealing means or on the feed structure, or on both, with a significant mechanical advantage;

hydraulic means for applying force to drive the cam means and to control the amount of force applied by the cam means to press the sealing means against the feed structure; and substantially regulated means for substantially stabilizing the amount of force applied by the hydraulic means to the cam means; said substantially regulated means comprising:

a supply of compressed gas;

at least one pneumatic vessel for receiving compressed gas from the supply;

a pneumatic pressure regulator for substantially stabilizing the pressure of the gas in the pneumatic vessel; and means for applying substantially stabilized pressure from the compressed gas in the pneumatic vessel to hydraulic fluid in the hydraulic means.

47. The apparatus of claim 46, wherein:

the at least one chamber in the feed structure is a generally U-shaped pocket that has two ends both open toward the sealing means; and the pneumatic means apply compressed gas in through the sealing means to the generally U-shaped pocket, to blow material from the generally U-shaped pocket out through the sealing means to the discharge port.

48. The apparatus of claim 47, for depositing such particulate material at a deposition point in a delivery site for such material; said apparatus further comprising:

a hopper for containing such material;

motor means, connected to drive the feed structure in rotation;

mobile support means, secured to the hopper, motor means, and feed structure for use in transporting the apparatus to such delivery site; and a delivery hose, communicating with the discharge port, for carrying material from the discharge port to such a deposition point.

49. The apparatus of claim 30, wherein:

the at least one chamber in the feed structure is a generally U-shaped pocket that has two ends both open toward the sealing means; and the pneumatic means apply compressed gas in through the sealing means to the generally U-shaped pocket, to blow material from the generally U-shaped pocket out through the sealing means to the discharge port.

50. The apparatus of claim 49, for depositing such particulate material at a deposition point in a delivery site for such material; said apparatus further comprising:

a hopper for containing such material;

motor means, connected to drive the feed structure in rotation;

mobile support means, secured to the hopper, motor means, and feed structure for use in transporting the apparatus to such delivery site; and a delivery hose, communicating with the discharge port, for carrying material from the discharge port to such a deposition point.

* * * * *